Jan. 26, 1926.
R. W. ANDREWS
STEAM PURIFIER
Filed Oct. 30, 1922
1,570,985
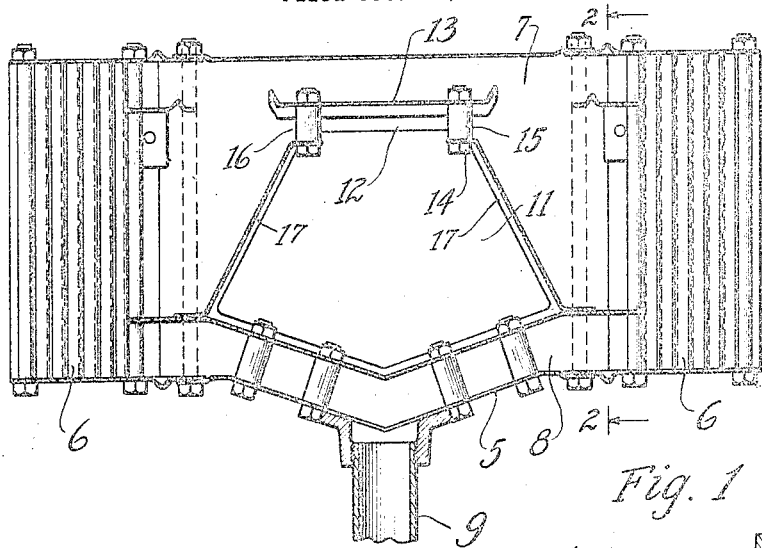
Fig. 1
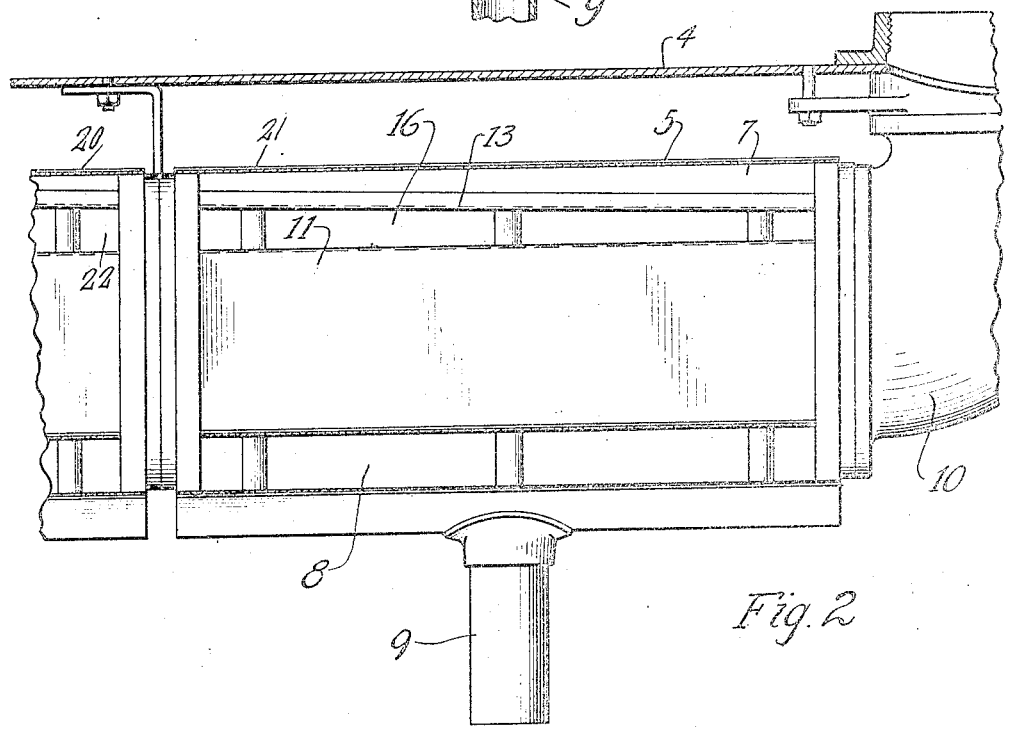
Fig. 2
INVENTOR:
Roger W. Andrews
By E. J. Andrews
Atty Patented Jan. 26, 1926.

1,570,985

UNITED STATES PATENT OFFICE.

ROGER W. ANDREWS, OF PITTSBURGH, PENNSYLVANIA, ASSIGNOR TO ANDREWS-BRADSHAW COMPANY, OF PITTSBURGH, PENNSYLVANIA, A CORPORATION OF PENNSYLVANIA.

STEAM PURIFIER.

Application filed October 30, 1922. Serial No. 597,708.

*To all whom it may concern:*

Be it known that I, ROGER W. ANDREWS, a citizen of the United States, residing at Pittsburgh, in the county of Allegheny and State of Pennsylvania, have invented certain new and useful Improvements in Steam Purifiers, of which the following is a specification.

This invention relates to improvements in fluid separators, and has for its object the production of means for more perfectly separating the impurities, particularly liquids, from various gases. The invention is directed particularly towards eliminating all of the liquid from the gas such as oil vapor or steam by maintaining the speed of the gas through the separator at the most desirable rate. A further object is to properly distribute the gas so that it will pass through all portions of the separator at substantially the same rate, and thus the capacity as well as the effectiveness of the separator will be increased. Other objects of the invention will be apparent from a consideration of the accompanying drawings and the following description thereof.

Of the drawings Fig. 1 is a transverse sectional view of a steam separator, which embodies the features of my invention; and Fig. 2 is a longitudinal sectional view of the separator mounted in a boiler.

Although I have herein illustrated and described a steam separator as embodying my invention, yet it is to be understood that the invention is applicable to the separation of fluids, such as the separation of moisture from steam, or purification of vapors or gases, and the term separator or purifier as used herein is intended to refer to any suitable form of fluid separator or vapor purifier wherein impurities such as liquid or solid particles are separated from the gas or vapor which it is desired to purify.

As is well understood, it is common, in order to separate impurities such as moisture from the steam, to pass the steam, on its way from the interior of the boiler to the steam mains of the system, through a purifier or separator. The purifier ordinarily comprises some form of baffles, around or through which the steam must pass, and so arranged that, while the steam itself will pass through, yet the impurities such as moisture will be retained and will pass back into the boiler. The invention which I have made is applicable to any ordinary type of steam purifier or separator, but for the purpose of illustrating my invention I prefer a purifier which is illustrated and described in the Patent No. 1,336,870, issued to H. H. Tracy, April 13, 1920, and reference may be had to that patent for further information as to details which are not material to any invention.

The apparatus which I prefer herein to illustrate my invention comprises a casing 5 in the sides of which are mounted systems of baffles 6. The casing when in use, is mounted within the boiler 4 and the steam passes through the baffles 6 into the interior chamber 7 of the purifier; and then, ordinarily, the steam passes through an outlet 10 out of the boiler 4 into the steam main of the system. As the steam passes through the baffles the moisture therein is stopped in its flow by the baffles and it runs downwardly into the passageway 8, and thence through a pipe 9 into the boiler water, or to any point to which it is desired to discharge this liquid.

I have found, however, that, if the speed of the steam through the baffles is too great, the separation of the moisture from the steam will be imperfect, as there is more or less of a tendency for the moisture, owing to spattering or otherwise, to be carried along with the steam. While the exact speed with which the steam passes through the baffles is not very material, yet I have found that the speed of some portion of the steam through ordinary purifiers or separators is too great. With the ordinary types of purifiers the passage of the steam through the purifier meets with less resistance as the outlet 10 is approached, hence, the steam entering near the outlet end of the purifier passes through the baffles at a much higher speed than that of the steam entering at more remote points. As a consequence the steam entering near the outlet passes through the baffles frequently at too high a speed, and, at the same time, the steam entering at remote points passes through the baffles at unnecessarily low speeds. Further if steps are taken, such as increasing the resistance through the baffles, to reduce the speed near the outlet to a speed which will give complete separation, the speed at remote points is so low that the capacity of the purifier is very greatly reduced.

Therefore, in order to properly distribute the steam so as to cause it to pass through the baffles at all portions of the purifier at substantially uniform speeds which are sufficiently low to produce perfect separation, or at least maximum separation, I provide means for obstructing the flow more and more as the outlet is approached, and I increase the resistance to the flow as the outlet is approached at such rate as to reduce the speed near the outlet without reducing the speed at more remote points materially below the speed near the outlet. Any suitable means may be used for producing such a resistance to the flow of the steam. In this instance I prefer to provide means within the passageway 7 so arranged that the resistance to the flow from this passageway to the outlet increases at a suitable rate as the outlet is approached.

In carrying out this provision I provide a passageway 11 running longitudinally within the passageway 7 and connected with passageway 7 by openings, the cross section of which decreases gradually as the outlet 10 is approached. In this instance I provide such openings by raising the top plate 13 of the central passageway 11 a material distance above the side walls 17 of the passageway. This may be done in any suitable manner such as by bolts 14 and collars 15. And I raise the rear end of the top plate 13 materially higher than the front or outlet end so as to provide a wedge shaped passageway or opening 16 between the central chamber 7 and the passageway 11 through which the steam must pass on its way from the baffles to the outlet 10. Thus by properly adjusting the inclination of the top plate 13 I am able to correspondingly vary the relative resistance to the flow of the steam from the baffles into the passageway 11 and hence to the outlet 10 so as to provide a flow of substantially uniform speed through the baffles throughout the entire length of the purifier. And by properly adjusting the lengths of the collars 13 this speed may be reduced to any desired amount.

Other sections 20 may be added to the section 21 of the separator, the slots 22 of the additional sections being also tapering, and being wider than those nearer the outlet.

I claim as my invention:

1. A steam separator comprising a hollow casing having openings in its walls, steam separating baffles mounted in said openings, a steam outlet connected to one end of said casing, an inner conduit in said casing, with its wall spaced from the walls of said casing, said conduit opening into said outlet, and said conduit having a narrow longitudinal opening through its wall extending substantially the entire length of the wall.

2. A steam separator comprising a hollow casing having openings in its walls, steam separating baffles mounted in said openings, a steam outlet connected to one end of said casing, an inner conduit in said casing, said conduit opening into said outlet, and said conduit having a narrow longitudinal opening through its wall extending substantially the entire length of the wall, said opening converging towards said outlet.

3. A gas purifier comprising a casing having an inner passageway, said casing having gas inlets into said passageway, said inlets having means for purifying the gas as it passes through a gas outlet connected with said inner passageway, and means for retarding the flow of gas through said purifying means, said retarding means comprising an elongated opening which is narrower at one end than at the other.

4. A steam purifier comprising an elongated casing, steam separating baffles mounted in the walls of said casing, an inner longitudinal passageway formed within said casing, a conduit mounted in said passageway the top of said conduit being spaced away from the sides of the conduit and thus providing elongated openings into said passageway, and a steam outlet fixed to said casing and communicating with said conduit.

5. A steam purifier comprising an elongated casing, steam purifying baffles mounted in the walls of said casing, an inner longitudinal passageway formed within said casing, the top of said passageway being spaced away from the sides of the passageway and thus providing elongated openings into said passageway, and a steam outlet fixed to said casing and communicating with said passageway, the portion of said top adjacent said outlet being nearer said sides than the portions of said top which are more remote from the outlet.

6. A steam purifier comprising an elongated casing, steam purifier baffles mounted in the walls of said casing, an inner longitudinal passageway formed within said casing, a conduit mounted in said passageway the top of said conduit being spaced away from the sides of the conduit and thus providing elongated openings into said passageway, and a steam outlet fixed to said casing and communicating with said conduit; the bottom of said conduit being spaced away from the bottom wall of said passageway.

7. A steam separator comprising a casing having an inner chamber with openings in its walls, steam separating baffles mounted in said openings, a steam outlet connected to one end of said casing, and an inner conduit mounted in said chamber, said conduit opening into said outlet, and said conduit having a narrow longitudinal opening through its wall extending substantially the entire length of the wall.

8. A fluid receiver comprising a casing, said casing having a fluid outlet and a fluid inlet, said inlet comprising an elongated opening, the width of said opening varying from one end to the other.

9. A fluid receiver having a plurality of long narrow fluid inlets, of unlike widths, the width of each of said inlets at any point increasing with the distance of the point from the outlet.

10. A fluid purifier comprising an elongated casing, an inner longitudinal conduit in the walls of said casing, said casing and conduit forming a chamber surrounding said conduit, purifying baffles mounted in said chamber, said casing having a fluid outlet, said conduit opening into said outlet, and a passageway connecting said chamber with the interior of said conduit.

11. A fluid receiver comprising a gas outlet and a plurality of long narrow fluid inlets, of unlike widths, the width of each of said inlets at any point increasing with the distance of the point from the outlet, and the width of any portion of a slot farther from the outlet being greater than a slot nearer the outlet.

12. A fluid separator comprising a casing having an inner passageway and having means in its walls for separating fluids, a fluid outlet connecting with said inner passageway, and additional means for retarding the flow of the fluid through said separating means, said retarding means arranged to control the fluid flow so as to make the speed of the fluid throughout all portions of the purifying means substantially uniform.

13. A gas purifier comprising a casing having purifying means in the walls, an internal conduit connected to the gas outlet, and openings in said conduit varying in an increasing ratio from one end to the other in such manner that the flow of gas into said conduit is of constant amount for each unit of length.

In testimony whereof, I hereunto set my hand.

ROGER W. ANDREWS.